(12) United States Patent
Yang

(10) Patent No.: US 10,564,409 B2
(45) Date of Patent: Feb. 18, 2020

(54) TELESCOPE AND FOCUS COVER THEREOF

(71) Applicant: William Yang, Taipei (TW)

(72) Inventor: William Yang, Taipei (TW)

( * ) Notice: Subject to any disclaimer, the term of this patent is extended or adjusted under 35 U.S.C. 154(b) by 136 days.

(21) Appl. No.: 15/867,966

(22) Filed: Jan. 11, 2018

(65) Prior Publication Data

US 2019/0212541 A1 Jul. 11, 2019

(51) Int. Cl.
*G02B 7/00* (2006.01)
*G02B 23/16* (2006.01)
*G02B 7/02* (2006.01)

(52) U.S. Cl.
CPC .............. *G02B 23/16* (2013.01); *G02B 7/021* (2013.01)

(58) Field of Classification Search
CPC ........ G02B 23/20; G02B 23/16; G02B 23/18; G02B 7/00; G02B 7/02; G02B 7/021
See application file for complete search history.

(56) References Cited

U.S. PATENT DOCUMENTS

| 4,909,617 | A * | 3/1990 | Boyd | G03B 11/041 |
|---|---|---|---|---|
| | | | | 359/511 |
| 6,104,887 | A * | 8/2000 | Hamasaki | G03B 11/045 |
| | | | | 396/534 |
| 6,199,988 | B1 * | 3/2001 | Krawczyk | B64G 1/361 |
| | | | | 343/840 |
| 6,269,227 | B1 * | 7/2001 | Hamasaki | G03B 11/045 |
| | | | | 396/534 |
| 6,527,871 | B1 * | 3/2003 | Hanson | A42B 3/26 |
| | | | | 134/18 |
| 8,186,628 | B2 * | 5/2012 | Gooden | B64G 1/54 |
| | | | | 244/171.7 |
| 9,846,009 | B1 * | 12/2017 | McDaniels | F41G 1/383 |
| 2004/0012852 | A1 * | 1/2004 | Shirai | G02B 23/18 |
| | | | | 359/480 |
| 2005/0157199 | A1 * | 7/2005 | Aoki | H04N 5/23209 |
| | | | | 348/360 |
| 2007/0075918 | A1 * | 4/2007 | Cuprys | F41G 3/165 |
| | | | | 345/8 |
| 2008/0204867 | A1 * | 8/2008 | Puga | B65D 23/00 |
| | | | | 359/399 |

(Continued)

*Primary Examiner* — William R Alexander
*Assistant Examiner* — Balram T Parbadia
(74) *Attorney, Agent, or Firm* — Li & Cai Intellectual Property (USA) Office

(57) ABSTRACT

A telescope includes a monocular assembly, an optical lens assembly, and a focus cover. The monocular assembly includes a monocular and a light-shielding tube movably sleeved at the monocular. The optical lens assembly is disposed in the light-shielding tube and is fixed on the monocular. The focus cover is detachably disposed on an end portion of the light-shielding tube and includes a tubular carrier, a focus sheet, and a covering body. The tubular carrier has a carrying portion formed on an inner side thereof, and includes a connecting portion and an accommodating portion respectively arranged at two opposite sides of the carrying portion. The connecting portion is detachably fastened to the end portion. The focus sheet is detachably positioned at the carrying portion and is arranged in the accommodating portion. The covering body is detachably fastened to the accommodating portion for shielding the focus sheet.

9 Claims, 8 Drawing Sheets

(56) References Cited

U.S. PATENT DOCUMENTS

| | | | |
|---|---|---|---|
| 2009/0041452 A1* | 2/2009 | Yoneji | B60R 11/04 396/535 |
| 2010/0319270 A1* | 12/2010 | Slade | B64G 1/222 52/71 |
| 2012/0019642 A1* | 1/2012 | Hillis | G02B 23/02 348/61 |
| 2016/0131961 A1* | 5/2016 | Ito | G03B 17/14 396/529 |

* cited by examiner

TELESCOPE AND FOCUS COVER THEREOF

BACKGROUND OF THE INVENTION

1. Field of the Invention

The present disclosure relates to a cover of a telescope; in particular, to a telescope and a focus cover thereof.

2. Description of Related Art

Conventional telescope (e.g., a monocular telescope) is provided with a dust cover integrally formed as a one-piece structure, and the dust cover only has a dustproof function and a protecting function. Moreover, if the conventional telescope needs to be used, the dust cover is first removed, and then the conventional telescope is in a focus process by miscellaneous members and steps.

SUMMARY OF THE INVENTION

The present disclosure provides a telescope and a focus cover thereof to solve the drawbacks associated with conventional telescopes.

The present disclosure discloses a telescope, which includes a monocular assembly, an optical lens assembly, and a focus cover. The monocular assembly includes a monocular and a light-shielding tube movably sleeved at the monocular. The optical lens assembly is disposed in the light-shielding tube and is fixed on the monocular. The optical lens assembly includes a hollow cylinder and a plurality of lenses separately arranged in the cylinder. The focus cover is detachably disposed on an end portion of the light-shielding tube and includes a tubular carrier, a focus sheet, and a covering body. The carrier has a carrying portion formed on an inner side thereof. The carrier includes a connecting portion and an accommodating portion respectively arranged at two opposite sides of the carrying portion, and the connecting portion of the carrier is detachably fastened to the end portion of the light-shielding tube. The focus sheet is detachably positioned at the carrying portion and is arranged in the accommodating portion. The covering body is detachably fastened to the accommodating portion. The focus sheet is arranged between the carrying portion and the covering body, and the covering body shields the focus sheet.

The present disclosure also discloses a focus cover of a telescope, which includes a tubular carrier, a focus sheet, and a covering body. The carrier has a carrying portion formed on an inner side thereof. The carrier includes a connecting portion and an accommodating portion respectively arranged at two opposite sides of the carrying portion, and the connecting portion of the carrier is configured for being detachably fastened to a tube. The focus sheet is detachably positioned at the carrying portion. The covering body is detachably fastened to the accommodating portion.

In summary, for the telescope and the focus cover of the present disclosure, the carrier and the covering body are detachably cooperated with each other, and the carrier is formed to position the focus sheet. Thus, the focus process of the telescope can be effectively simplified by using the focus cover so that the value of the focus cover can be increased.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Reference is made to FIGS. 1 to 8, which illustrate an embodiment of the present disclosure. References are hereunder made to the detailed descriptions and appended drawings in connection with the present disclosure. However, the appended drawings are merely provided for exemplary purposes, and should not be construed as restricting the scope of the present disclosure.

Figure 1:
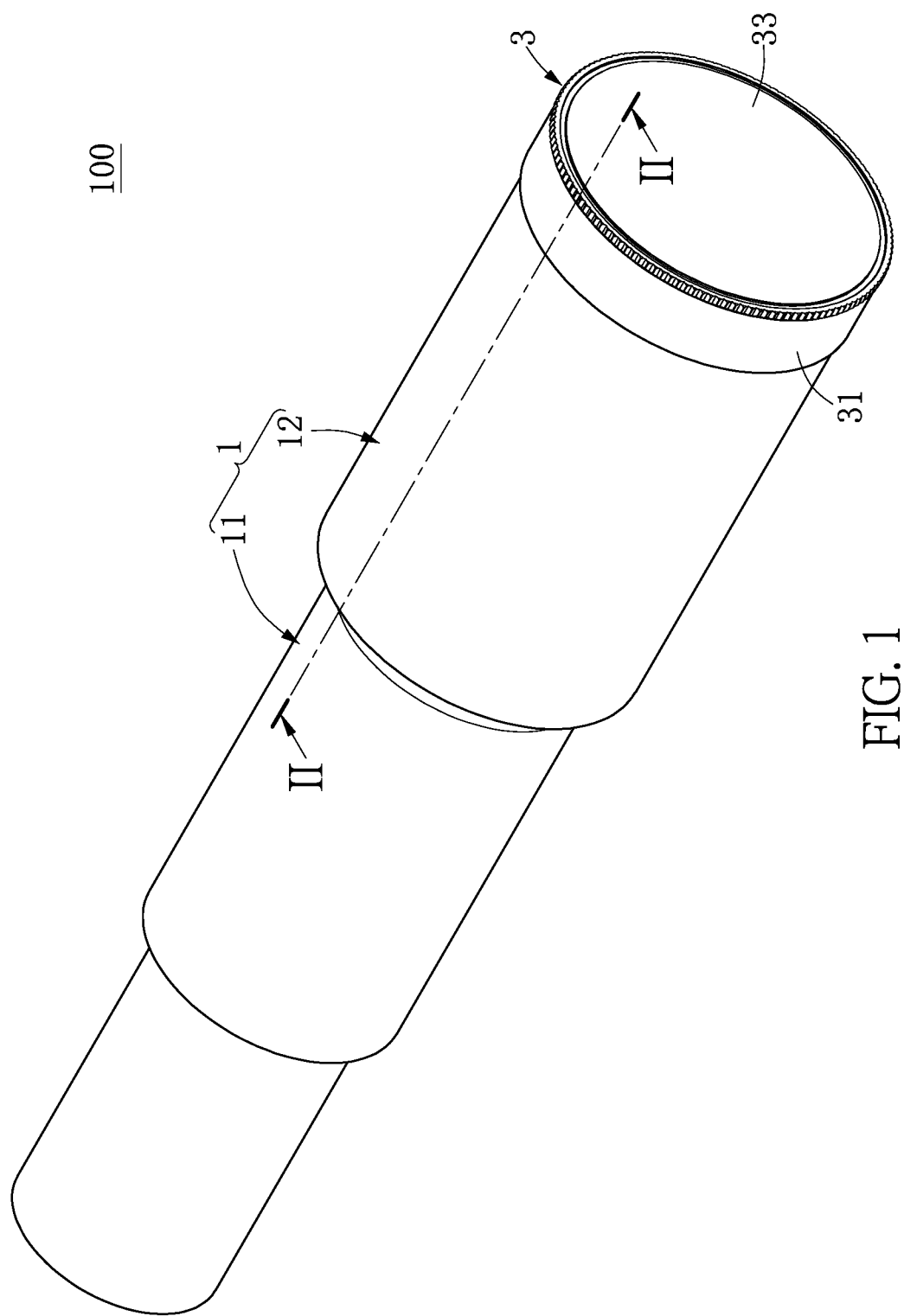
FIG. 1 is a perspective view showing a telescope according to the present disclosure.
Figure 2:
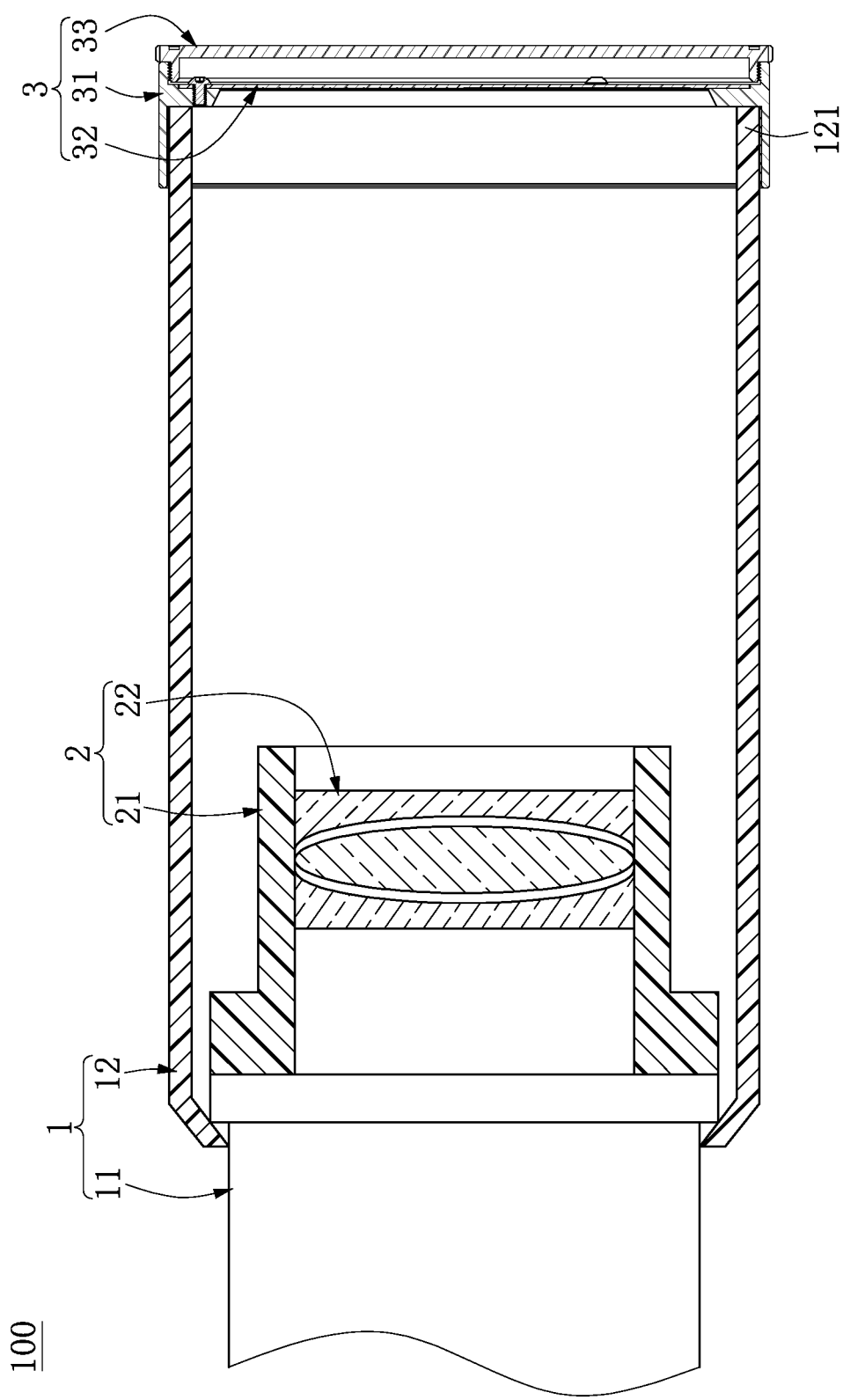
FIG. 2 is a cross-sectional view taken along a cross-sectional line II-II of FIG. 1.
Figure 3:
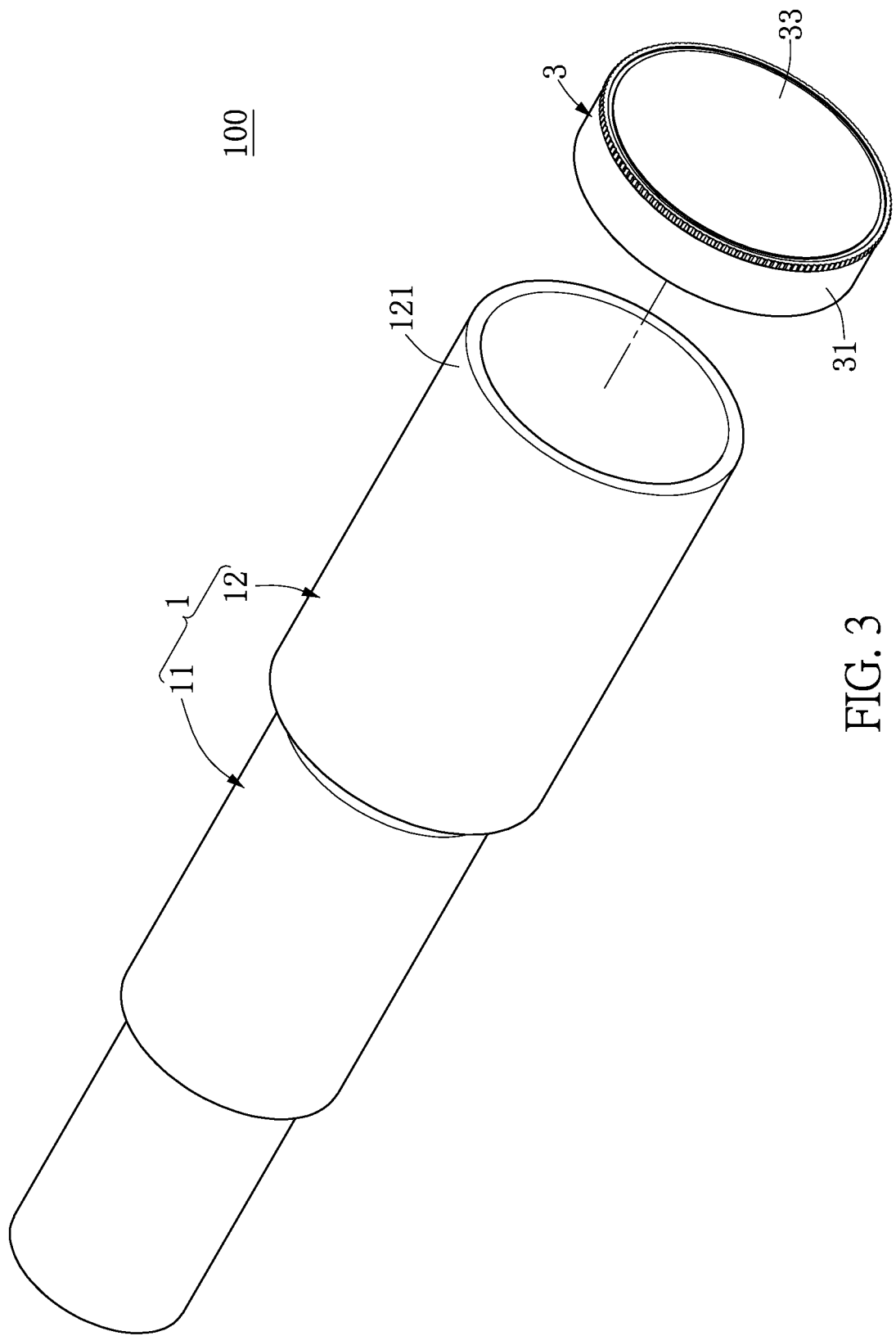
FIG. 3 is an exploded view of FIG. 1.

As shown in FIGS. 1 to 3, the present embodiment discloses a telescope 100, and the telescope 100 can be a monocular telescope or an astronomical telescope, but the present disclosure is not limited thereto. The telescope 100 includes a monocular assembly 1, an optical lens assembly 2 fastened to an inner side of the monocular assembly 1, and a focus cover 3 detachably fastened to the monocular assembly 1. It should be noted that the focus cover 3 in the present embodiment is cooperated with the monocular assembly 1, but the present disclosure is not limited thereto. In other embodiments of the present disclosure, the focus cover 3 can be applied to other telescopes different from the present embodiment.

The monocular assembly 1 includes a monocular 11 and a light-shielding tube 12 movably sleeved at the monocular 11, in which the light-shielding tube 12 can also be named as a dew shield. The monocular 11 includes at least one lens (not shown). The light-shielding tube 12 is a hollow structure and is provided without any lenses. The optical lens assembly 2 is disposed in the light-shielding tube 12 and is fixed on the monocular 11. The optical lens assembly 2 includes a hollow cylinder 21 and a plurality of lenses 22 separately arranged in and fixed to the cylinder 21.

Moreover, the light-shielding tube 12 is movable in a longitudinal direction of the monocular 11 so as to extend a light channel of the monocular 11, thereby preventing outer lights from interfering to the lenses 22 of the optical lens assembly 2.

Figure 4:
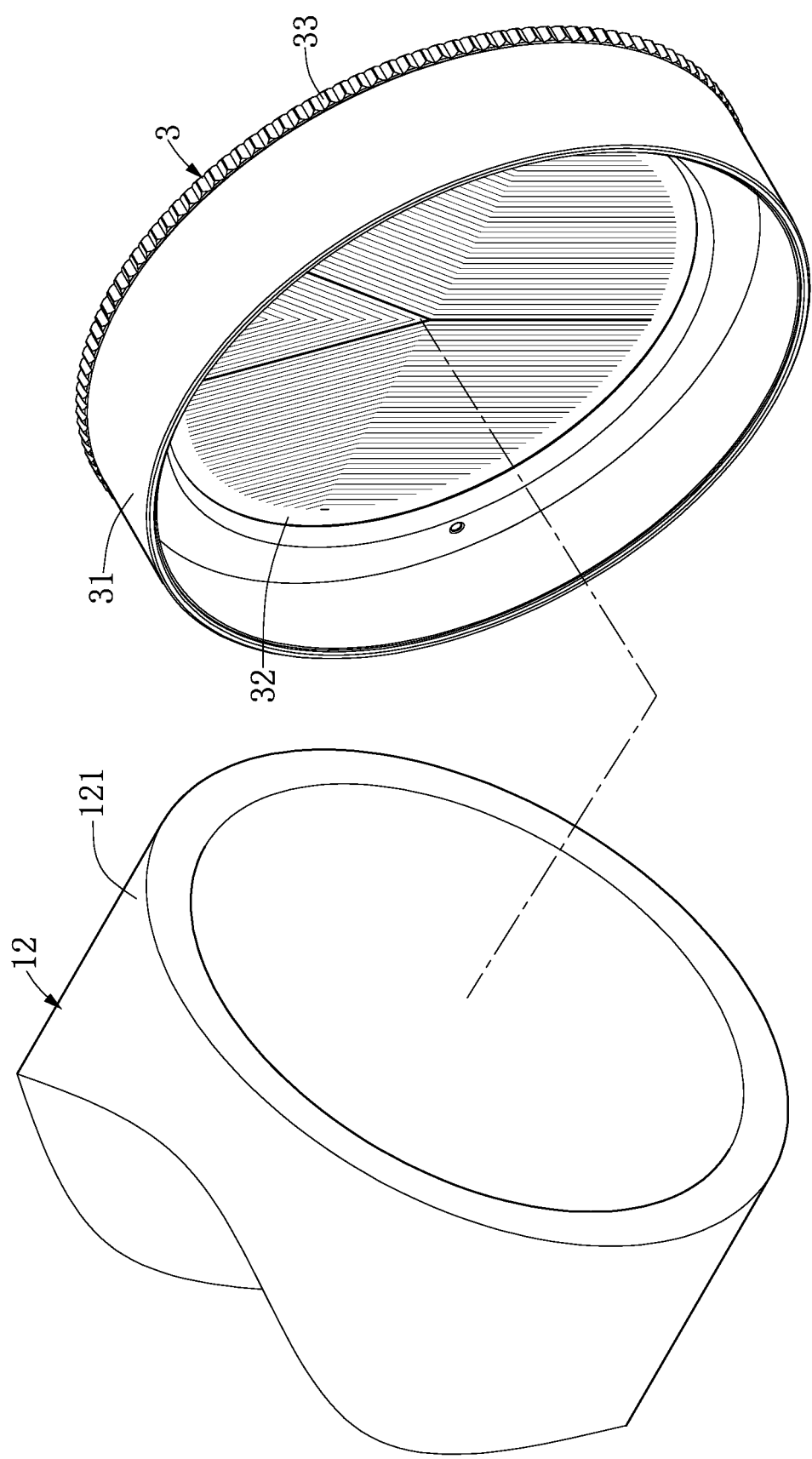
FIG. 4 is an exploded view of FIG. 1 in another perspective.
Figure 5:
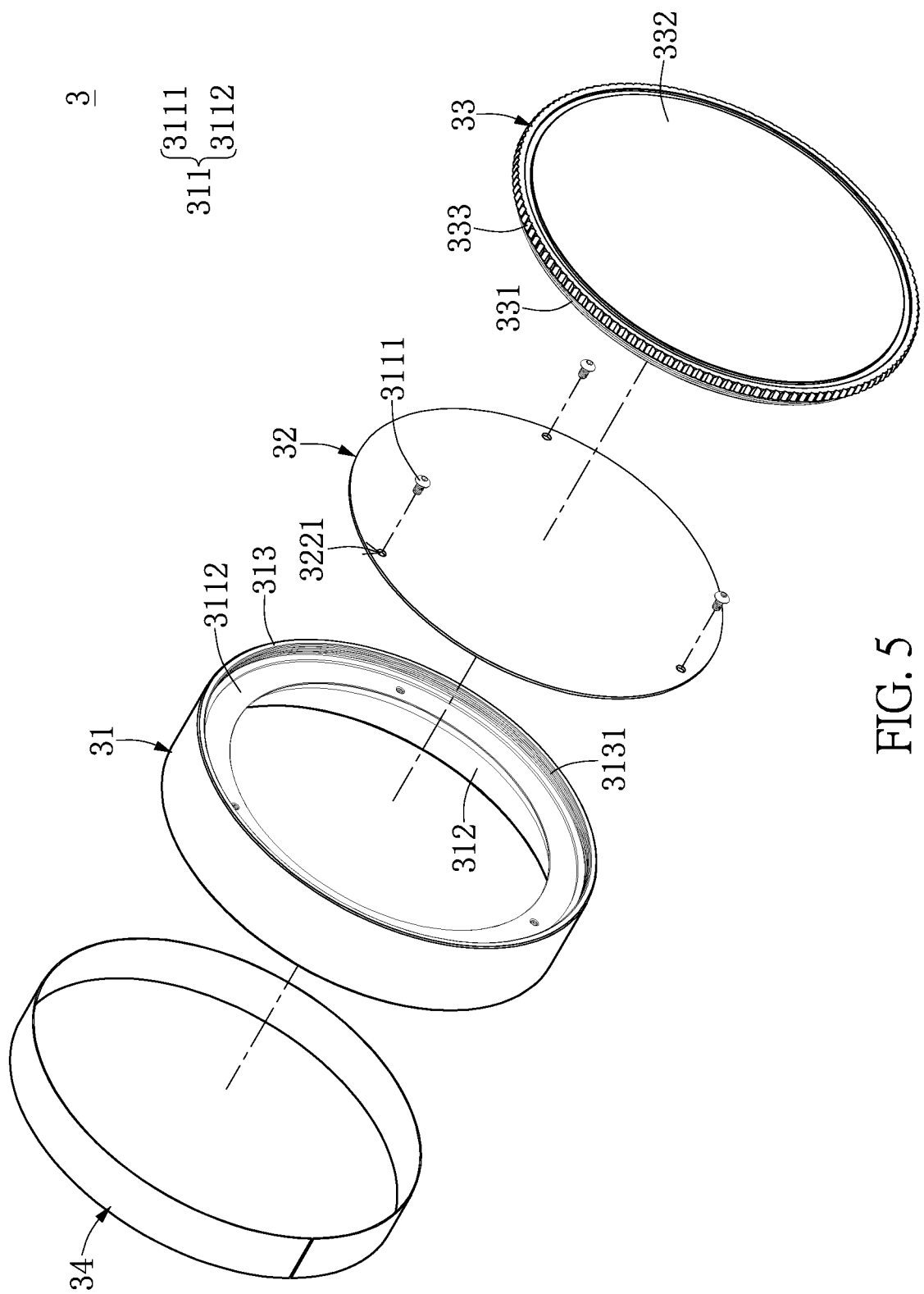
FIG. 5 is an exploded view showing a focus cover of the telescope according to the present disclosure.
Figure 6:
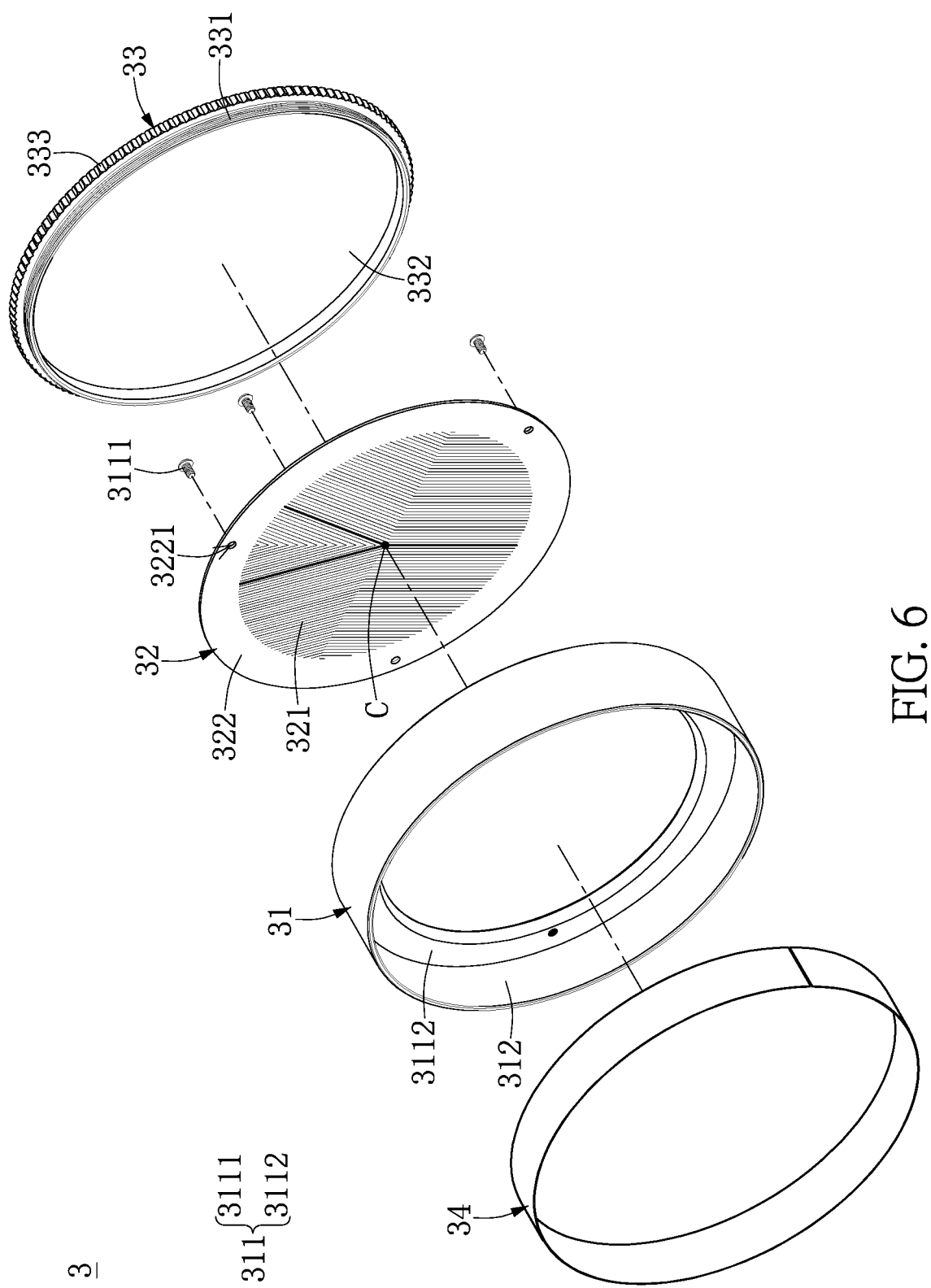
FIG. 6 is an exploded view showing the focus cover of the telescope in another perspective according to the present disclosure.

As shown in FIGS. 4 to 6, the focus cover 3 is detachably disposed on an end portion 121 of the light-shielding tube 12 (i.e., a right end portion of the light-shielding tube 12 as shown in FIG. 4). The focus cover 3 includes a tubular carrier 31, a focus sheet 32 disposed on the carrier 31, and a covering body 33 detachably fastened to carrier 31. The following description discloses the structure of each component of the focus cover 3, but the present disclosure is not limited thereto.

The carrier 31 in the present embodiment is integrally formed as a one-piece structure and includes a carrying portion 311 formed on an inner side thereof. The carrier 31 includes a connecting portion 312 and an accommodating portion 313 respectively arranged at two opposite sides of the carrying portion 311. Specifically, as shown in FIG. 5, a left ring-shaped portion of the carrier 31 is the connecting portion 312, and a right ring-shaped portion of the carrier 31 is the accommodating portion 313. A height of accommodating portion 313 in the present embodiment is less than that of the connecting portion 312. The connecting portion 312 of the carrier 31 is detachably fastened to the end portion 121 of the light-shielding tube 12, and the cooperation between the carrier 31 and the light-shielding tube 12 can be adjusted according to design requirements.

In the present embodiment, the focus cover 3 can further include a mating layer 34 fixed to an inner surface of the connecting portion 312. The end portion 121 of the light-shielding tube 12 is detachably inserted into the mating layer 34, and the mating layer 34 abuts against the end portion 121 of the light-shielding tube 12. Thus, the relative position between the focus cover 3 and the light-shielding tube 12 can be firmly maintained by the friction cooperation between the mating layer 34 and the end portion 121.

As shown in FIGS. 4 to 6, the covering body 33 is detachably fastened to the accommodating portion 313, and the cooperation between the carrier 31 and the covering body 33 can be adjusted according to design requirements. For example, the accommodating portion 313 of the carrier 31 has a thread structure 3131, the covering body 33 has a thread portion 331, and the covering body 33 is fastened to the accommodating portion 313 by assembling the thread portion 331 to the thread structure 3131.

In the present embodiment, the thread structure 3131 is arranged on the inner surface of the accommodating portion 313, and the covering body 33 includes a circular flat portion 332 and the thread portion 331 having a ring-shaped cross-section and perpendicularly extending from the flat portion 332. The thread portion 331 has a thread arranged on an outer surface thereof, and the thread portion 331 is disposed in the accommodating portion 313 after the covering body 33 is fastened to the covering body 31. Moreover, the covering body 33 has a plurality of protrusions 333 connected in sequence and extending from an outer side edge of the flat portion 332. The protrusions 333 protrudes from the outer side surface of the carrier 31 for providing a forcing position, thereby facilitating the assembling and disassembling between the covering body 33 and the carrier 31.

Figure 7:
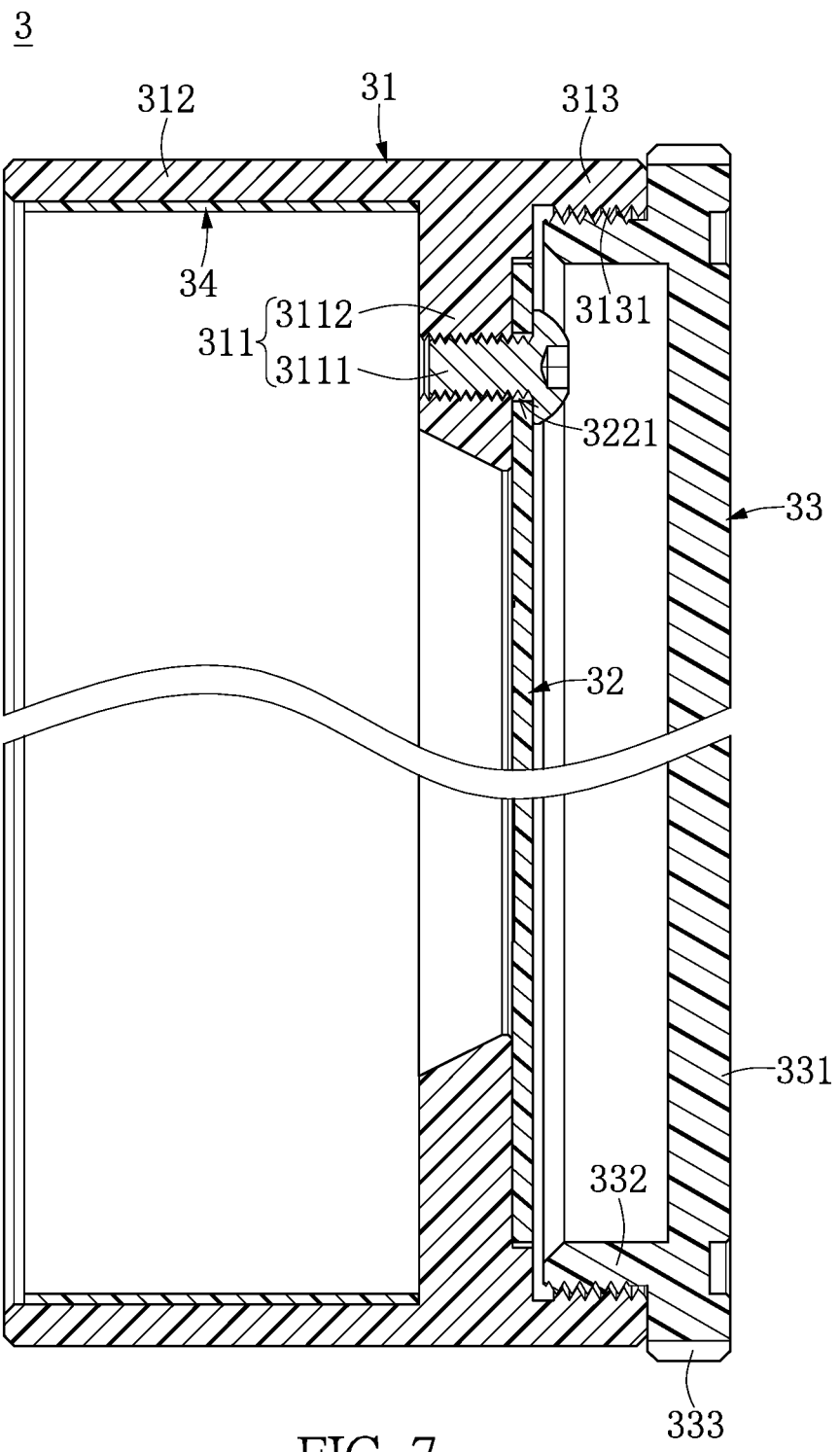
FIG. 7 is a cross-sectional view taken along a cross-sectional line V II-V II of FIG. 3.

As shown in FIGS. 5 to 7, the focus sheet 32 is detachably positioned at the carrying portion 311 and is arranged in the accommodating portion 313. The focus sheet 32 is arranged between the carrying portion 311 and the covering body 33, and the covering body 33 shields the focus sheet 32. The focus sheet 32 includes a focus segment 321 and an installing segment 322 arranged outside the focus segment 321, and the installing segment 322 is detachably positioned at the carrying portion 311. Moreover, the cooperation between the carrier 31 and the focus sheet 32 can be adjusted according to design requirements.

In the present embodiment, the carrying portion 311 includes a plurality of positioning structures 3111, the installing segment 322 has a plurality of mating structures 3221, and the mating structures 3221 are respectively fastened to the positioning structures 3111 so as to maintain the relative position between the focus sheet 32 and the carrier 31. Specifically, the carrying portion 311 further includes a carrying ring 3112, each of the positioning structures 3111 can be a screw used for being fastened to the carrying ring 3112, and each of the mating structures 3221 can be a through hole formed on the installing segment 322. The focus sheet 32 is fixed to the carrying ring 3112 by using the positioning structures 3111 (i.e., screws) to respectively couple through the mating structures 3221 (i.e., through holes).

Furthermore, the contour of the carrying portion 311 is approximately a ring shape, and a projecting region defined by orthogonally projecting the carrying portion 311 onto the focus sheet 32 surrounds the focus segment 321, but the present disclosure is not limited thereto. For example, in other embodiments of the present disclosure, the carrying portion 311 can be a plurality of sheets in an annular arrangement, and the positioning structures 3111 (e.g., screws) can be respectively fastened to the sheets of the carrying portion 311.

The installing segment 322 in the present embodiment has a ring shape and surrounds the focus segment 321, but the present disclosure is not limited thereto. For example, in other embodiments of the present disclosure, the installing segment 322 can be a plurality of sheets in an annular arrangement, and the positioning structures 3111 (e.g., screws) can be respectively fastened to the sheets of the installing segment 322.

For the focus cover 3 of the present embodiment, the carrier 31 and the covering body 33 are detachably cooperated with each other, and the carrier 31 is formed to position the focus sheet 32. Thus, the focus process of the telescope 100 of the present embodiment can be effectively simplified by using the focus cover 3 so that the value of the focus cover 3 can be increased.

Specifically, a central optical axis defined by the lenses of the telescope 100 passes through the focus cover 3, so the carrier 31 can be formed to position the focus sheet 32 according to the relationship between the focus cover 3 and the central optical axis. Thus, the position of the focus sheet 32 can correspond to the central optical axis by using the carrier 31 so that the focus cover 3 can be used for precisely implementing the focus process of the telescope 100.

If the telescope 100 needs to be used, the covering body 33 is first removed from the carrier 31, and then the focus sheet 32 positioned by the carrier 31 is used to implement the focus process of the telescope 100. Finally, the carrier 31 and the focus sheet 32 positioned on the carrier 31 are removed from the light-shielding tube 12, and then the monocular assembly 1 and the optical lens assembly 2 can be used to observe an predetermined object.

Figure 8:
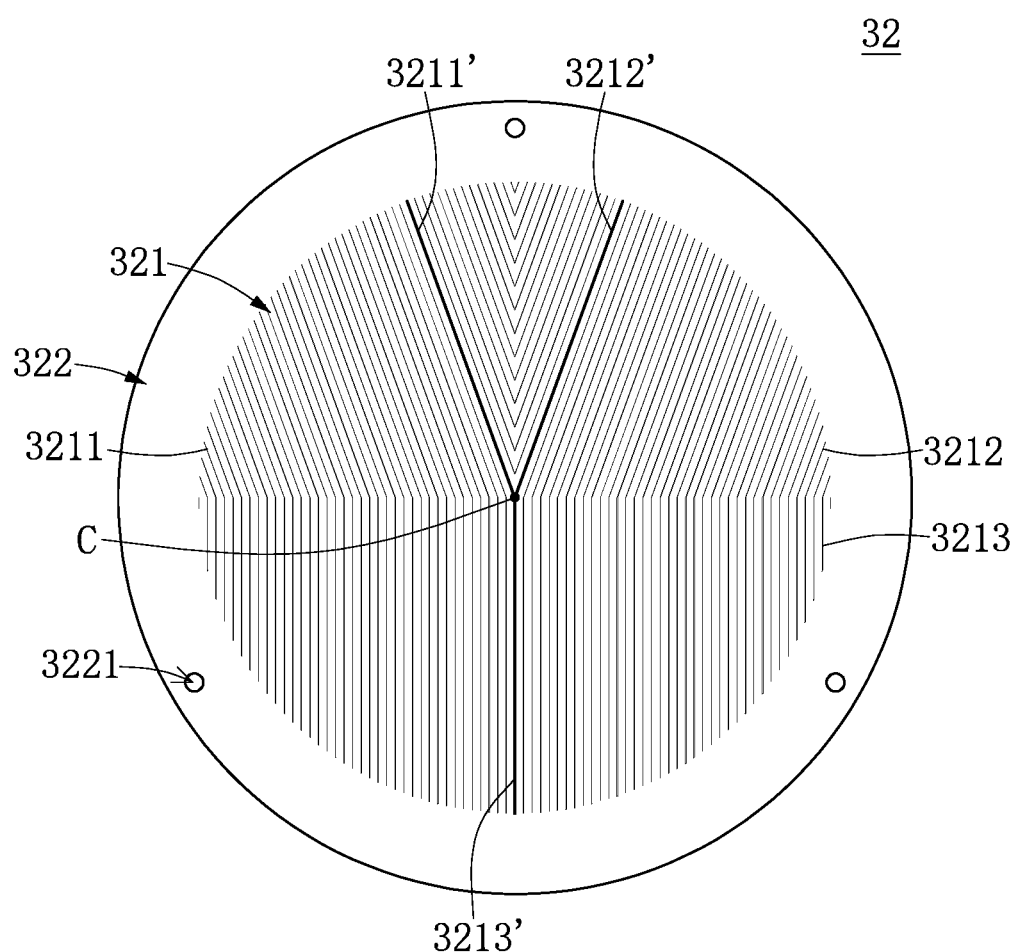
FIG. 8 is a planar view showing a focus sheet of the focus cover according to the present disclosure.

It should be noted that the size of the focus sheet 32 and the pattern of the focus segment 321 can be adjusted according to design requirements. In the present embodiment, as shown in FIG. 8, the focus segment 321 of the focus sheet 32 has a circle shape and defines four quadrants. The focus sheet 32 includes a plurality of first strips 3211, a plurality of second strips 3212, and a plurality of third strips 3213. The first strips 3211 and the second strips 3212 are respectively arranged on two of the four quadrants (i.e., the first strips 3211 are arranged on the upper-left quadrant, and the second strips 3212 are arranged on the upper-right quadrant), and the third strips 3213 are arranged on the other two quadrants (i.e., the third strips 3213 are arranged on the lower two quadrants).

Specifically, the first strips 3211 are parallel to each other and have different length, one of the first strips 3211, which is referenced as 3211', is connected to a center C of circle of the focus segment 321. The second strips 3212 are parallel to each other and have different length, and one of the second strips 3212, which is referenced as 3212', is connected to the center C of circle of the focus segment 321. The third strips 3213 are parallel to each other and have different length, and one of the third strips 3213, which is referenced as 3213', is connected to the center C of circle of the focus segment 321.

The first strip 3211', the second strip 3212', and the third strip 3213', which are connected to the center C of circle of the focus segment 321, are jointly formed as a Y-shaped strip. That is to say, each of the first strip 3211', the second strip 3212', and the third strip 3213' has a length substantially equal to a radius of the focus segment 321 of the focus sheet 32, but the present disclosure is not limited thereto. The first strip 3211' and the second strip 3212' have an acute angle. The first strip 3211' and the third strip 3213' have an obtuse angle equal to an obtuse angle between the second strip 3212' and the third strip 3213'.

Moreover, the third strips 3213 excluding the Y-shaped strip each is connected to one of the first strips 3211 or one of the second strips 3212 in an obtuse angle, and the first strips 3211 un-connected to the third strips 3213 are respectively connected to the second strips 3212 un-connected to the third strips 3213 in an acute angle.

It should be noted that the focus sheet 32 in the present embodiment is a transparent sheet (e.g., an optical acrylic sheet), and the first strips 3211, the second strips 3212, and the third strips 3213 are non-transparent strips formed on the transparent sheet. In other embodiments of the present disclosure, the focus sheet 32 can be a non-transparent sheet, and the first strips 3211, the second strips 3212, and the third strips 3213 are elongated through holes and are dis-connected with each other.

Moreover, the focus sheet 32 in the present embodiment is arranged in the accommodating portion 313 of the carrier 31, but the present disclosure is not limited thereto. For example, in other embodiments of the present disclosure, the focus sheet 32 can be stored separately from the carrier 31 and the covering body 33, so when the telescope 100 needs to be in the focus process, the covering body 33 is first removed from the carrier 31, and then the focus sheet 32 is taken to be positioned at the carrying portion 311 of the carrier 31.

The Effects Associated with the Present Embodiments

In summary, for the telescope and the focus cover of the present embodiment, the carrier and the covering body are detachably cooperated with each other, and the carrier is formed to position the focus sheet. Thus, the focus process of the telescope of the present embodiment can be effectively simplified by using the focus cover so that the value of the focus cover can be increased.

Specifically, the central optical axis defined by the lenses of the telescope passes through the focus cover, so the carrier can be formed to position the focus sheet according to the relationship between the focus cover and the central optical axis. Thus, the position of the focus sheet can correspond to the central optical axis by using the carrier so that the focus cover can be used for precisely implementing the focus process of the telescope.

Moreover, the focus cover of the present embodiment adapts the structural design of the carrier to effectively cooperate with the covering body, the focus sheet, and the end portion of the light-shielding tube. Thus, the value of the focus cover can be increased without hugely changing the contour of the conventional cover.

In addition, the focus sheet of the present embodiment is manufactured by forming a specific pattern (i.e., the first strips, the second strips, and the third strips) on a transparent sheet, and the focus effect and the value of the focus sheet can be effectively increased through the specific pattern.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A telescope, comprising:
    a monocular assembly including:
        a monocular; and
        a light-shielding tube movably sleeved at the monocular;
    an optical lens assembly disposed in the light-shielding tube and fixed on the monocular, wherein the optical lens assembly includes a hollow cylinder and a plurality of lenses separately arranged in the cylinder; and
    a focus cover detachably disposed on an end portion of the light-shielding tube and including:
        a tubular carrier having a carrying portion formed on an inner side thereof, wherein the carrier includes a connecting portion and an accommodating portion respectively arranged at two opposite sides of the carrying portion, and the connecting portion of the carrier is detachably fastened to the end portion of the light-shielding tube;
        a focus sheet detachably positioned at the carrying portion and arranged in the accommodating portion; and
        a covering body detachably fastened to the accommodating portion, wherein the focus sheet is arranged between the carrying portion and the covering body, and the covering body shields the focus sheet,
    wherein a height of the accommodating portion is less than that of the connecting portion, the accommodating portion has a thread structure, the covering body has a thread portion, and the covering body is fastened to the accommodating portion by assembling the thread portion to the thread structure.

2. The telescope as claimed in claim 1, wherein the carrying portion includes a plurality of positioning structures, the focus sheet includes a focus segment and an installing segment arranged outside the focus segment, the installing segment has a plurality of mating structures, and the mating structures are respectively fastened to the positioning structures so as to maintain the relative position between the focus sheet and the carrier.

3. The telescope as claimed in claim 1, wherein the focus cover further includes a mating layer fixed to an inner surface of the connecting portion, and the mating layer abuts against the end portion of the light-shielding tube.

4. The telescope as claimed in claim 1, wherein the focus sheet includes a circular focus segment and an installing segment arranged outside the focus segment, and the focus segment defines four quadrants and includes:
    a plurality of first strips and a plurality of second strips, wherein the first strips and the second strips are respectively arranged on two of the four quadrants, the first strips are parallel to each other, one of the first strips is connected to a center of circle of the focus segment, the second strips are parallel to each other, and one of the second strips is connected to the center of circle of the focus segment; and a plurality of third strips arranged on the other two quadrants, wherein the third strips are parallel to each other, and one of the third strips is connected to the center of circle of the focus segment, wherein the first strip, the second strip, and the third strip, which are connected to the center of circle of the focus segment, are jointly formed as a Y-shaped strip.

5. The telescope as claimed in claim 4, wherein the third strips excluding the Y-shaped strip each is connected to one of the first strips or one of the second strips in an obtuse angle, and the first strips un-connected to the third strips are respectively connected to the second strips un-connected to the third strips in an acute angle.

6. The telescope as claimed in claim 1, wherein the focus sheet is a transparent sheet and includes a focus segment and an installing segment arranged outside the focus segment, the installing segment is detachably positioned at the carrying portion having a ring shape, and a projecting region defined by orthogonally projecting the carrying portion onto the focus sheet surrounds the focus segment.

7. A focus cover of a telescope, comprising:
a tubular carrier having a carrying portion formed on an inner side thereof, wherein the carrier includes a connecting portion and an accommodating portion respectively arranged at two opposite sides of the carrying portion, and the connecting portion of the carrier is configured for being detachably fastened to a tube;
a focus sheet detachably positioned at the carrying portion; and
a covering body detachably fastened to the accommodating portion,
wherein the focus sheet is a transparent sheet and includes a circular focus segment and an installing segment arranged outside the focus segment, and the focus segment defines four quadrants and includes:
a plurality of first strips and a plurality of second strips, wherein the first strips and the second strips are respectively arranged on two of the four quadrants, the first strips are parallel to each other, one of the first strips is connected to a center of circle of the focus segment, the second strips are parallel to each other, and one of the second strips is connected to the center of circle of the focus segment; and
a plurality of third strips arranged on the other two quadrants, wherein the third strips are parallel to each other, and one of the third strips is connected to the center of circle of the focus segment, wherein the first strip, the second strip, and the third strip, which are connected to the center of circle of the focus segment, are jointly formed as a Y-shaped strip, wherein the third strips excluding the Y-shaped strip each is connected to one of the first strips or one of the second strips in an obtuse angle, and the first strips un-connected to the third strips are respectively connected to the second strips un-connected to the third strips in an acute angle.

8. The focus cover as claimed in claim 7, further comprising a mating layer fixed to an inner surface of the connecting portion and configured for being abutted against the tube, wherein a height of accommodating portion is less than that of the connecting portion, the accommodating portion has a thread structure, the covering body has a thread portion, and the covering body is fastened to the accommodating portion by assembling the thread portion to the thread structure, wherein the carrying portion includes a plurality of positioning structures, the focus sheet includes a focus segment and an installing segment arranged outside the focus segment, the installing segment has a plurality of mating structures, and the mating structures are respectively fastened to the positioning structures so as to maintain the relative position between the focus sheet and the carrier.

9. A focus cover of a telescope, comprising:
a tubular carrier having a carrying portion formed on an inner side thereof, wherein the carrier includes a connecting portion and an accommodating portion respectively arranged at two opposite sides of the carrying portion, and the connecting portion of the carrier is configured for being detachably fastened to a tube;
a focus sheet detachably positioned at the carrying portion;
a covering body detachably fastened to the accommodating portion; and
a mating layer fixed to an inner surface of the connecting portion and configured for being abutted against the tube, wherein a height of accommodating portion is less than that of the connecting portion, the accommodating portion has a thread structure, the covering body has a thread portion, and the covering body is fastened to the accommodating portion by assembling the thread portion to the thread structure, wherein the carrying portion includes a plurality of positioning structures, the focus sheet includes a focus segment and an installing segment arranged outside the focus segment, the installing segment has a plurality of mating structures, and the mating structures are respectively fastened to the positioning structures so as to maintain the relative position between the focus sheet and the carrier.

* * * * *